(12) United States Patent
Isano et al.

(10) Patent No.: US 6,213,504 B1
(45) Date of Patent: *Apr. 10, 2001

(54) AUTOMOBILE KNEE BOLSTER STRUCTURE

(75) Inventors: Makoto Isano, Hamakita; Takanobu Fujimura, Iwata, both of (JP)

(73) Assignee: Suzuki Motor Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,120

(22) Filed: Dec. 22, 1998

(30) Foreign Application Priority Data

Dec. 25, 1997 (JP) .................................... 9-356705

(51) Int. Cl.⁷ .................................... B60R 21/045
(52) U.S. Cl. .................... 280/748; 280/752; 296/70
(58) Field of Search .................... 280/748, 750, 280/751, 752; 180/90; 296/70, 189, 191

(56) References Cited

U.S. PATENT DOCUMENTS

| | | | |
|---|---|---|---|
| 4,400,011 | * 8/1983 | Matsuno | 280/748 |
| 4,709,943 | * 12/1987 | Yoshimura et al. | 280/751 |
| 4,893,834 | * 1/1990 | Honda et al. | 280/751 |
| 4,946,192 | * 8/1990 | Kuwahara | 280/751 |
| 4,978,136 | * 12/1990 | Tomita et al. | 280/751 |
| 5,413,379 | * 5/1995 | Koma | 280/751 |
| 5,518,270 | * 5/1996 | Hanada et al. | 280/748 |
| 5,676,216 | * 10/1997 | Palma et al. | 296/70 |
| 5,718,453 | * 2/1998 | Kassel et al. | 280/748 |
| 5,931,520 | * 8/1999 | Seksaria et al. | 280/752 |
| 5,934,733 | * 8/1999 | Manwaring | 280/752 |
| 5,951,045 | * 9/1999 | Almefelt et al. | 280/748 |

FOREIGN PATENT DOCUMENTS

| | | |
|---|---|---|
| 4-63745 | 2/1992 | (JP) . |
| 5-50889 | 2/1993 | (JP) . |
| 08164811 | 6/1996 | (JP) . |

* cited by examiner

*Primary Examiner*—J. J. Swann
*Assistant Examiner*—Christopher Bottorff
(74) *Attorney, Agent, or Firm*—Finnegan, Henderson, Farabow, Garrett & Dunner, L.L.P.

(57) ABSTRACT

The present invention is an automobile knee bolster structure capable of absorbing knee impact loads originating from various directions, and also having an upper portion able to absorb greater magnitude loads than the bottom portion of the bolster.

9 Claims, 10 Drawing Sheets

AUTOMOBILE KNEE BOLSTER STRUCTURE

BACKGROUND OF THE INVENTION

1. Field of the Invention

The present invention relates to an automobile knee bolster that during a collision absorbs the energy of impact between the knees of an occupant and the dashboard, and in particular to a knee bolster that can be used on the driver side or on the passenger side of the dashboard.

2. Description of Related Art

Conventionally, knee bolsters are provided in the lower portion of a vehicle dashboard, facing the legs of passengers sitting in the front seats of an automobile.

In some designs, the lid that covers the glove compartment located in front of the passenger seat is used as part of the knee bolster assembly on the passenger side of the dashboard, as described in Japanese Laid Open Patent Application Hei 4[1992]-63745; and in Japanese Laid Open Patent Application Hei 5[1993]-50889.

FIG. 12 shows one example of a knee bolster structure for the passenger side of a dashboard, wherein the glove compartment lid is used as the knee bolster.

A steering support member (101) is located facing the front seats, and extends along the car width. Member (101) supports the dashboard (102). The glove compartment (103) is located on the passenger side of the dashboard (102), and has a lid (104) containing a reinforcement (105). Knee bolster (106) is supported by the can impact the dashboard approximately at the location of the glove compartment lid (104).

When a conventional knee bolster structure is used, lid (104) deforms to absorb the impact energy from the passenger knees. The impact energy is further carried to the knee bolster (106) located behind lid (104). Thus when the impact has sufficient energy, not only does the lid (104) deform, but the knee bolster (106) also deforms to absorb the load.

With the conventional knee bolster structures, however, the lateral dimension of the lid along the width of the car must correspond to the lateral dimension of the knee bolster (106). Therefore, the length of the reinforcement (105) along the car width becomes large, and the reinforcement's weight increases. One problem of the conventional design is thus excessive weight of the glove compartment assembly (103).

Another problem of the conventional knee bolster is that the top and bottom portions of the knee bolster have the same stiffness, and cannot accommodate different impact forces.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

The present invention resolves the aforementioned problems. One objective of the invention is thus to provide an automobile knee bolster structure that is light and is capable of absorbing varied loads resulting from a collision with the passenger knees. These loads can be applied to the structure from different directions, and can have different magnitudes depending on whether they are applied to the upper or lower portion of the knee bolster by impacts with the knees of large or small passengers, respectively. According to the present invention, the knee bolster structure is located in the lower portion of an instrument panel, and portions of the knee bolster main body are formed with a closed cross section structure designed for strength and for absorbing the impact from passenger knees.

The knee bolster structure according to the present invention includes a main body that comprises a knee bolster upper panel and a reinforcement member joined to the top portion of the knee bolster upper panel, oriented along the car width. The knee bolster upper panel and the reinforcement member form a closed cross section structure of greater stiffness than the rest of the knee bolster, which is formed from a plate-like structure. The knee bolster main body is located in a position corresponding to the glove compartment, and thus comprises knee bolster side panels located on both sides of the glove compartment, the aforementioned upper panel, and a reinforcement member joined to the top side of the knee bolster upper panel to form the closed cross section structure. A reinforcement arranged as a continuation of the aforementioned knee bolster panels within the lid of the aforementioned glove compartment is also provided.

In a collision, the knees of a larger passenger tend to impact the dashboard with a large force due to the weight of the passenger, and the impact takes place near the upper portion of the dashboard, due to the size of the passenger's legs. Conversely, a smaller, lighter passenger's knees will tend to impact with the lower portion of the dashboard, and with less force.

The present invention compensates for the different impact forces that the upper and lower portions of the bolster have to withstand by using a knee bolster main body that has a reinforced upper portion, including a reinforcement member that together with the upper portion of the knee bolster panel forms a closed cross section structure, also known as a box structure. Consequently, large loads can be absorbed by deformation of the upper portion of the knee bolster main body, to address the situation when a large passenger is involved in a collision.

When a smaller passenger is involved in a collision, a smaller load is applied to the lower part of the knee bolster main body. The lower portion of the knee bolster main body is reinforced by the knee bolster panels and by the reinforcement panel in the glove compartment lid, so that the knee bolster panels and the reinforcement panel deform to absorb the load. These panels are made from a plate-like structure that is less rigid than the closed cross section structure.

The knee bolster main body according to the present invention has an upper portion with a closed cross section structure that provides increased rigidity, and has a lower portion reinforced by the extensive use of reinforcement material such as sheet metal. Thus, the knee bolster main body can dissipate by deformation loads having a wide range of magnitudes, larger on the upper portion, and smaller on the lower portion of the knee bolster.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings.

Wherever possible, the same reference numbers will be used throughout the drawings to refer to the same or like parts.

Figure 1:
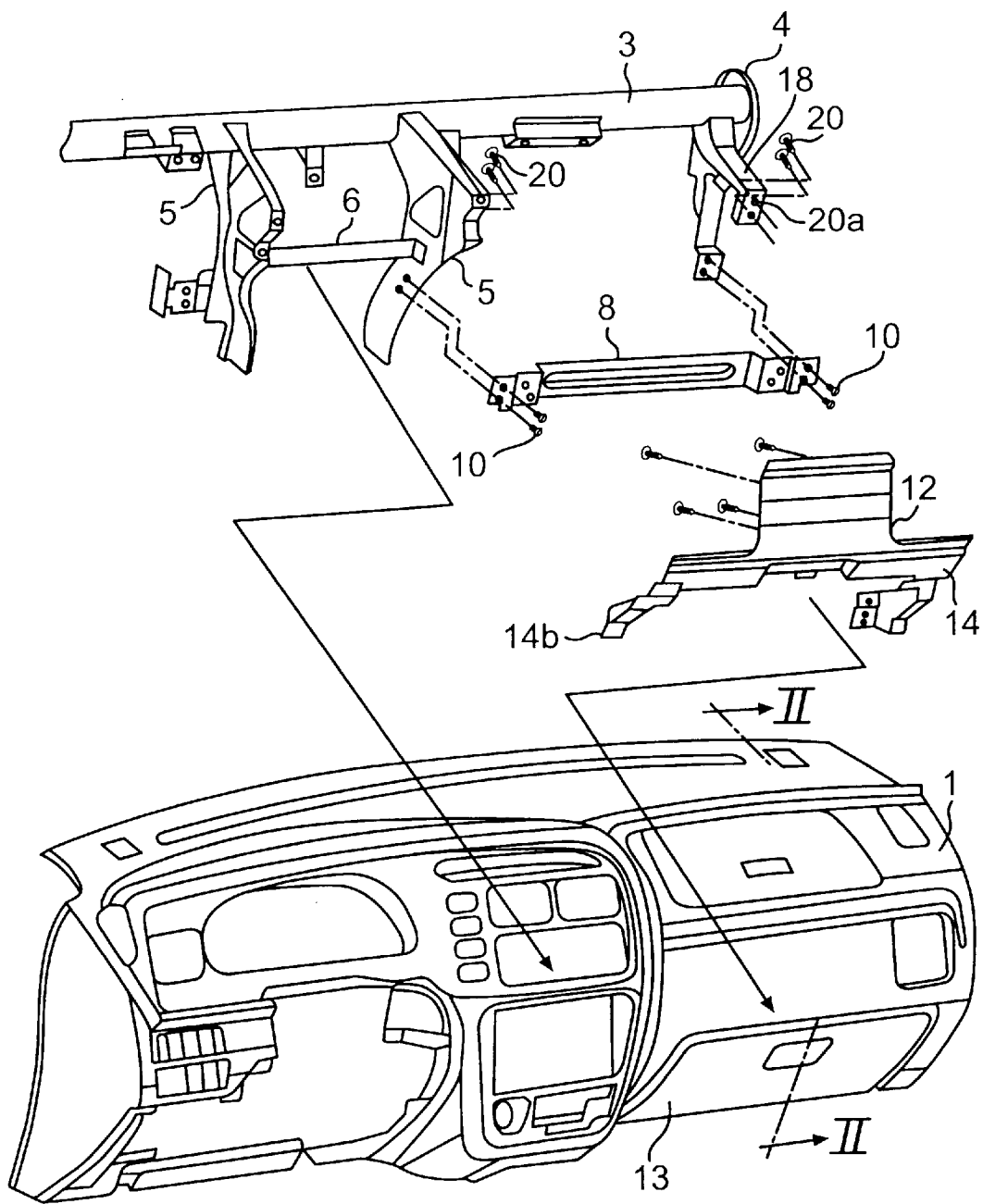
FIG. 1 is an exploded perspective view of one embodiment of the automobile knee bolster structure according to the present invention, used on the passenger side.
Figure 2:
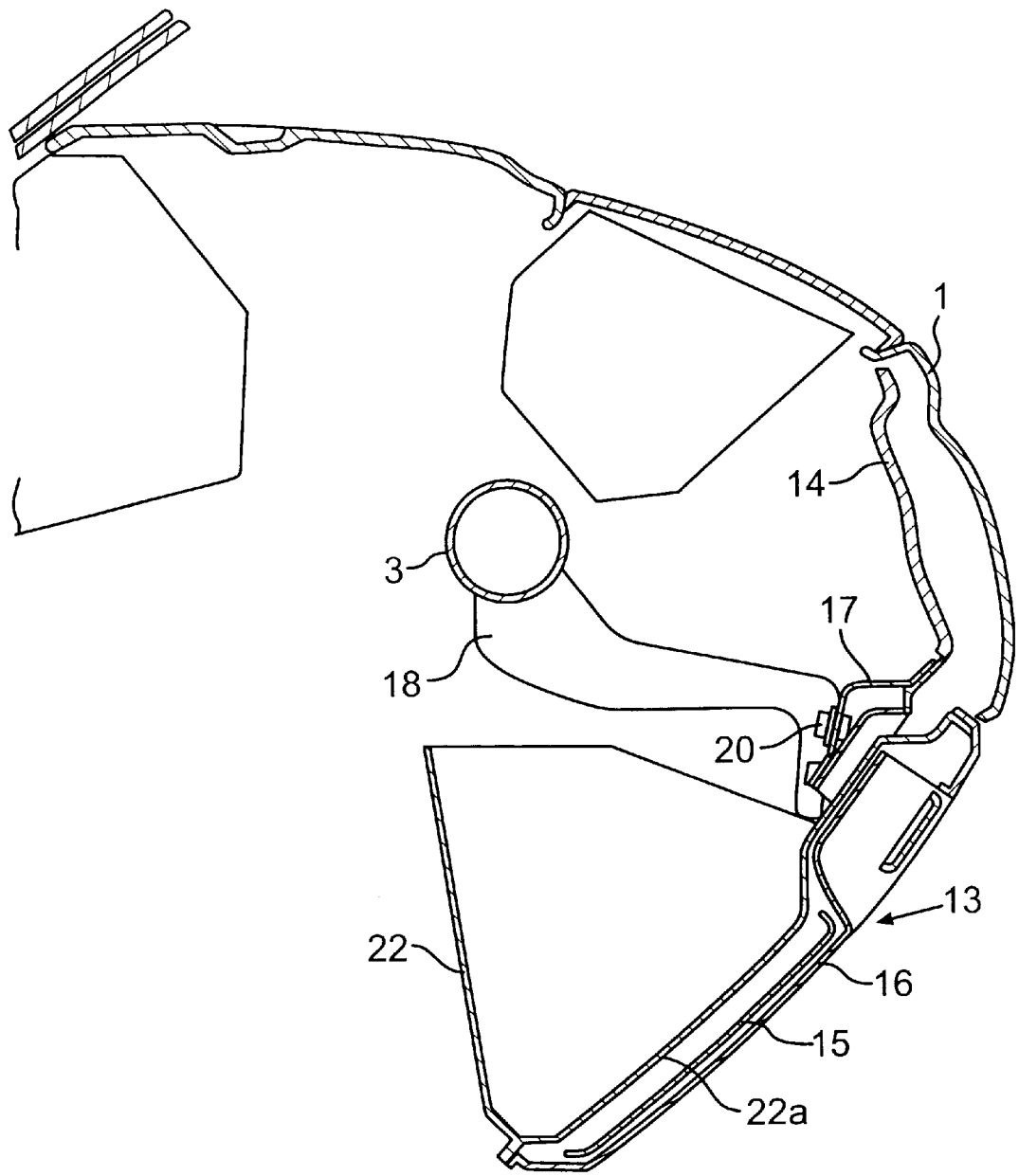
FIG. 2 is a cross sectional view along line II—II of FIG. 1.
Figure 3:
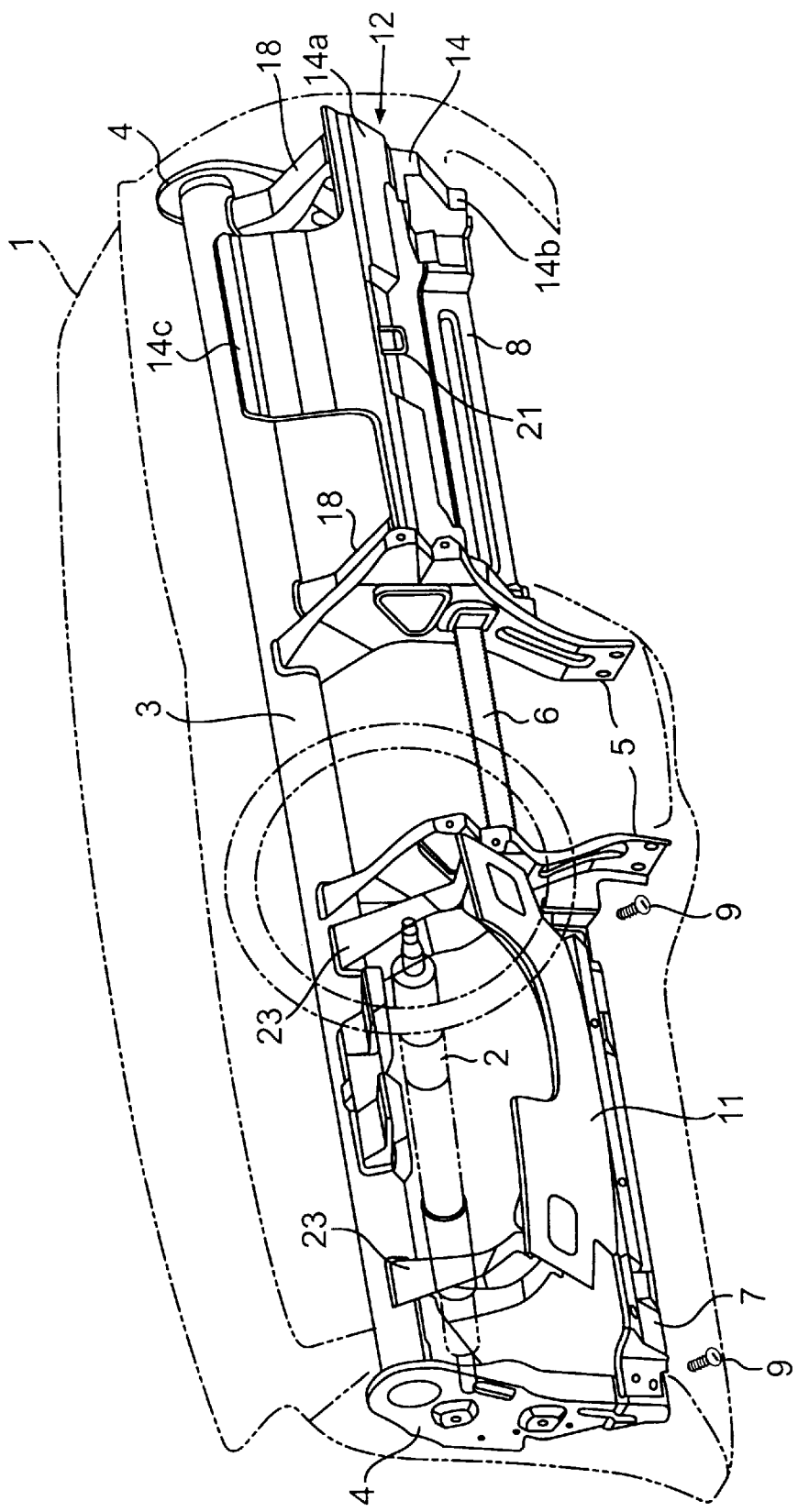
FIG. 3 is a perspective view showing the steering support member and the knee bolster main body attachment components on the driver and passenger sides according to a second embodiment of the present invention.

As shown in FIGS. 1 through 3, steering support member (3) is provided behind the dashboard, facing the front seats to support the steering column (2) within the instrument panel. The support member (3) extends along the width of the car, and is attached to the car chassis by brackets (4).

A pair of braces (5) extend downward from the central portion of the steering support member (3). The two braces (5) are connected by a stay (6). Member (8) connects the passenger side bracket (4) to the passenger side brace (5), while member (7) does the same on the driver side. Both members are attached by screws (9) and (10), respectively. In another embodiment, a driver side knee bolster main body (11) may also be mounted between the steering support member (3) and member (7), while a passenger side knee bolster main body (12) is mounted between the steering support member (3) and member (8). Members (7) and (8) are made of a material like thin steel plate, or other materials of similar properties, and are less rigid that the steering support member (3) which is made from piping, such as steel tube.

Figure 4:
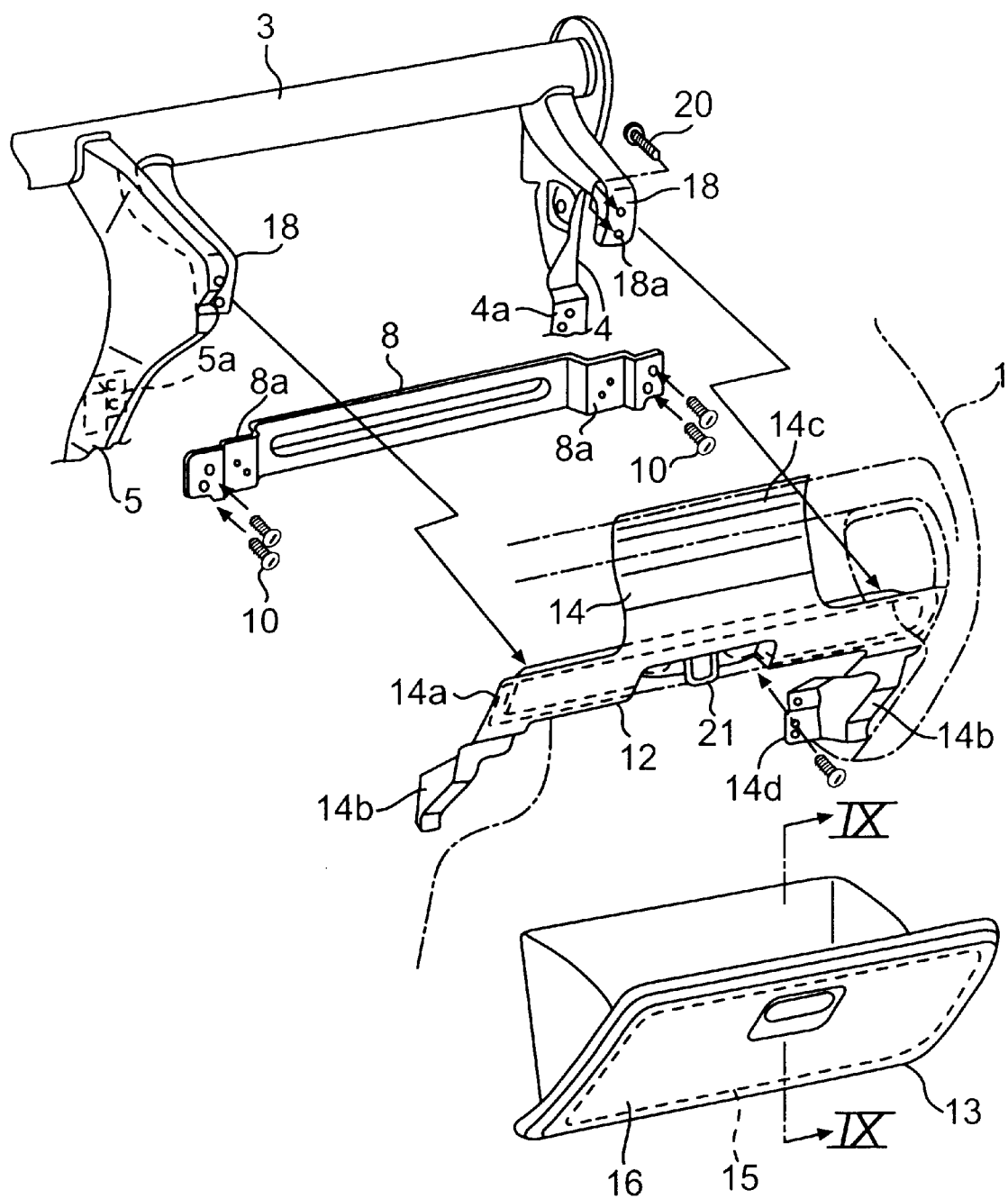
FIG. 4 is an exploded perspective view showing a portion of the steering support member and a passenger side knee bolster main body.
Figure 5:
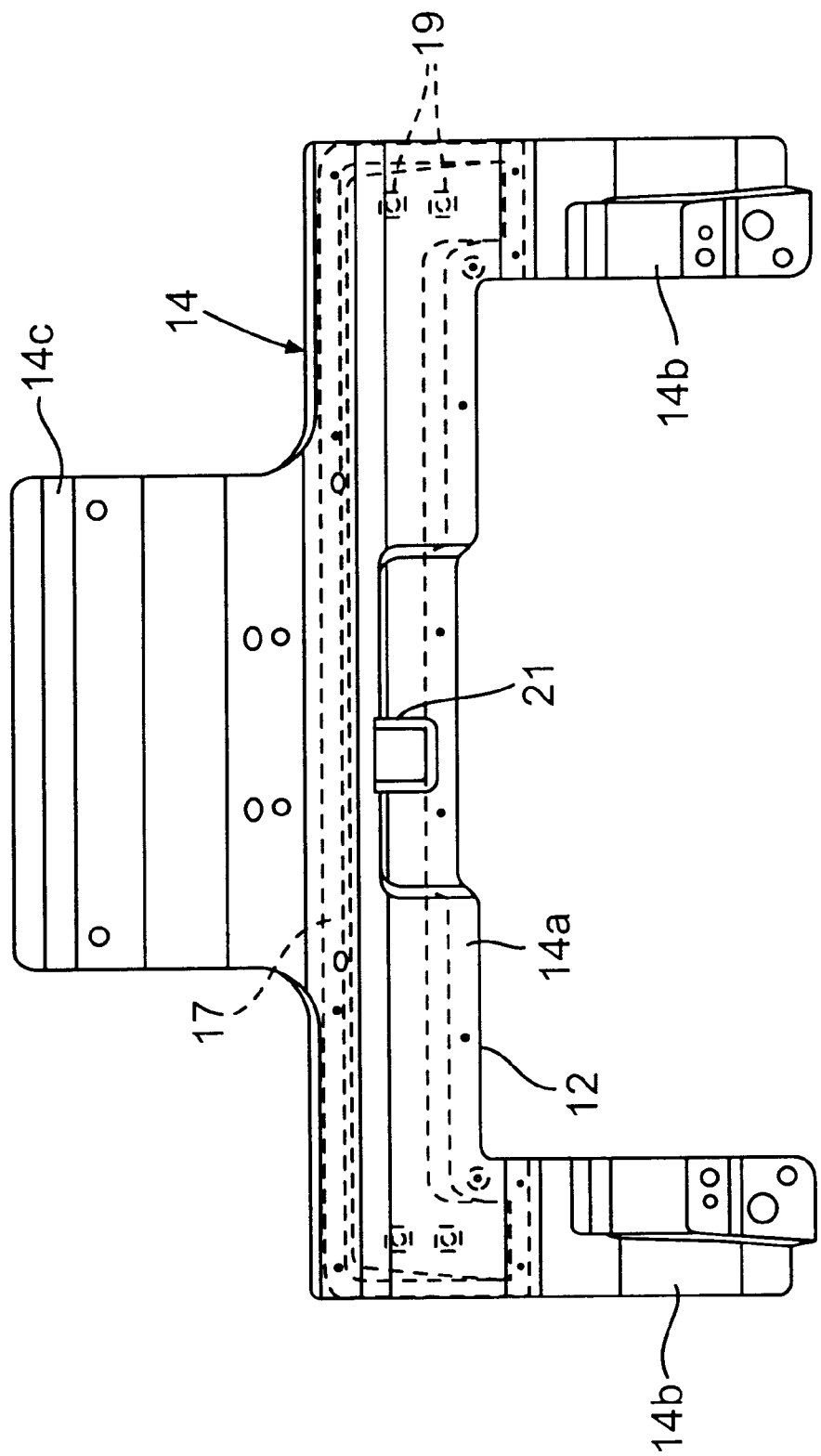
FIG. 5 is a front elevation view showing the passenger side knee bolster main body.

The knee bolster main body (12) on the passenger side comprises, as shown in FIGS. 4 and 5, an arch-shaped knee bolster panel (14) that surrounds the perimeter of the glove compartment, and a lid (16) to close the glove compartment that houses a reinforcement panel (15).

Figure 6:
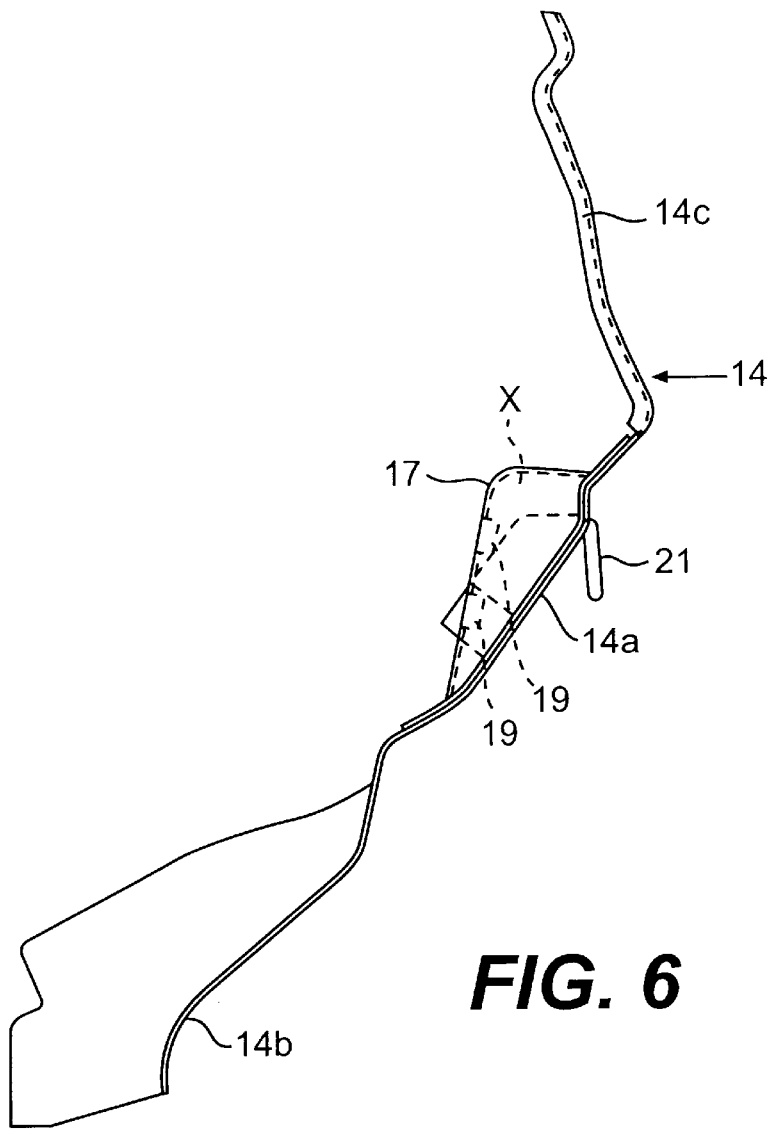
FIG. 6 is a left side elevation view of the passenger side knee bolster main body of FIG. 5.
Figure 7:
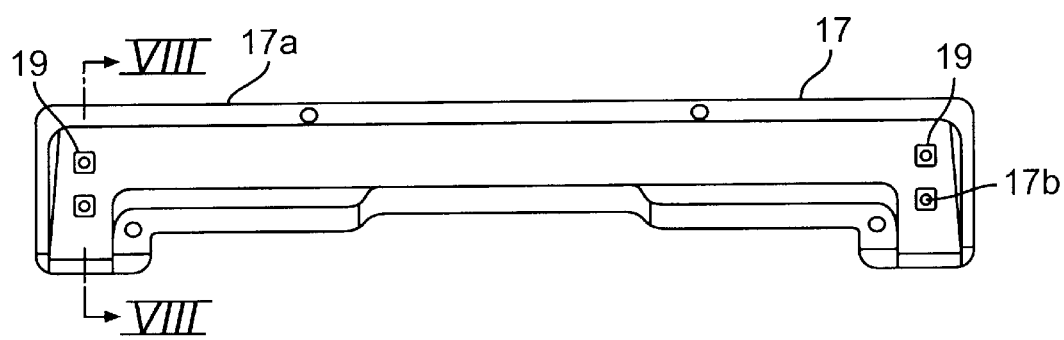
FIG. 7 is a front elevation view of the reinforcement member.
Figure 8:
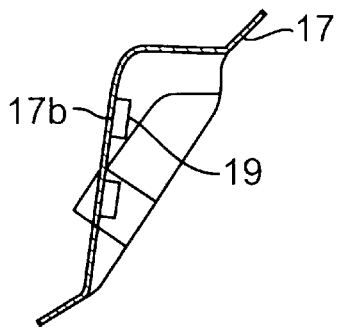
FIG. 8 is a cross sectional view on line VIII—VIII of FIG. 7.

The knee bolster panel (14) comprises an upper portion (14a) located in the upper part of the glove compartment (13), side portions (14b) located on both the left and right sides of the glove compartment, and a protruding component (14c) extending up from the central part of the top edge of the upper portion (14a). As shown in FIGS. 6 and 8, a reinforcement member (17), together with the upper portion (14a), forms a closed cross section structure indicated by X. The peripheral edge (17a) of the reinforcement member 17 can be attached to the back surface of the upper portion (14a) of the knee bolster, for example, by spot welding. This closed cross section structure, also called a box structure, is stronger than similar structures formed by flat plates or panels.

The knee bolster main body (12) is mounted by screws to the pair of stays (18) welded to the steering support member. Screw holes (17b) are provided on both sides of the reinforcement member (17) of the knee bolster main body (12), and nuts (19) are welded to the back surfaces of screw holes (17b). The knee bolster main body (12) is fastened to the ends of stays (18) by engaging the screws (20) in the nuts (19) and threading the screws (20) through the screw holes (18a) provided in the tips of the stays (18). Flanges (14d) extending from the side portions (14b) of the knee bolster main body (12) are mounted with screws in screw holes (not shown in the figures) provided in the flanges (8a) of member (8), and are thereby secured to the steering support member (3). The protruding part (14c) of the knee bolster panel (14) is secured to the back surface of the instrument panel (1) by a screw, also not shown in the figure. A striker (21) for the lock of the glove compartment (13) is located in the lower central part of the knee bolster panel (14).

Figure 9:
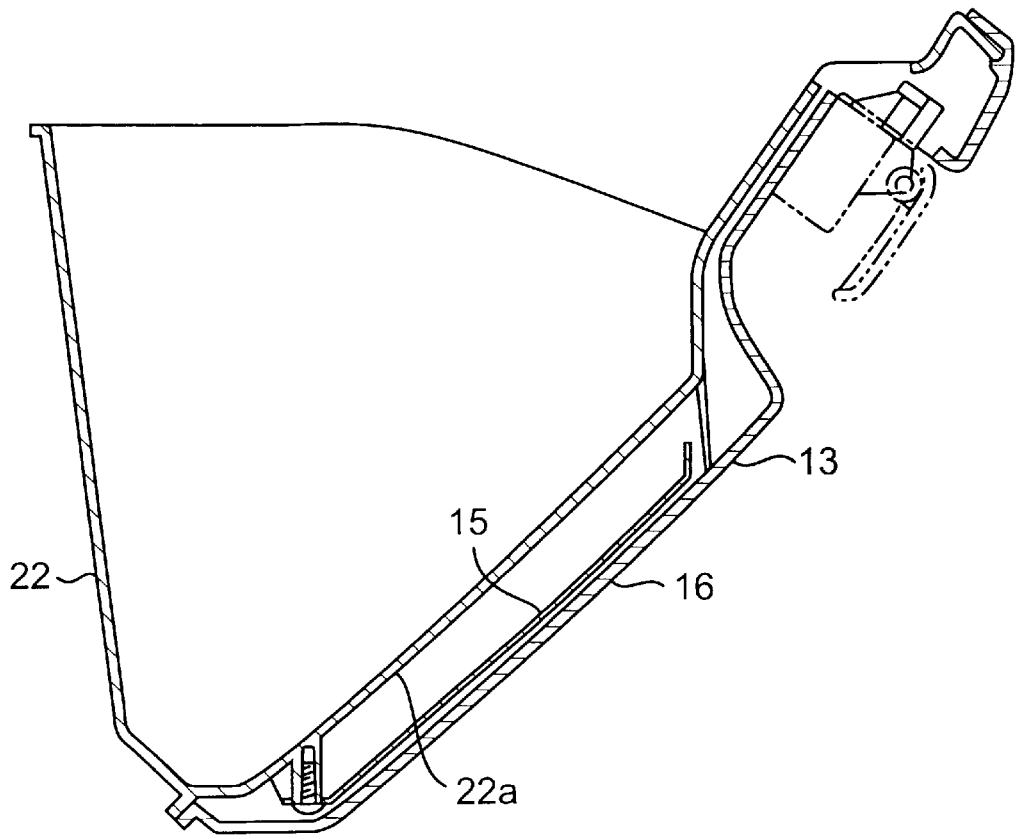
FIG. 9 is a cross sectional view on line IX—IX of FIG. 4.
Figure 10:
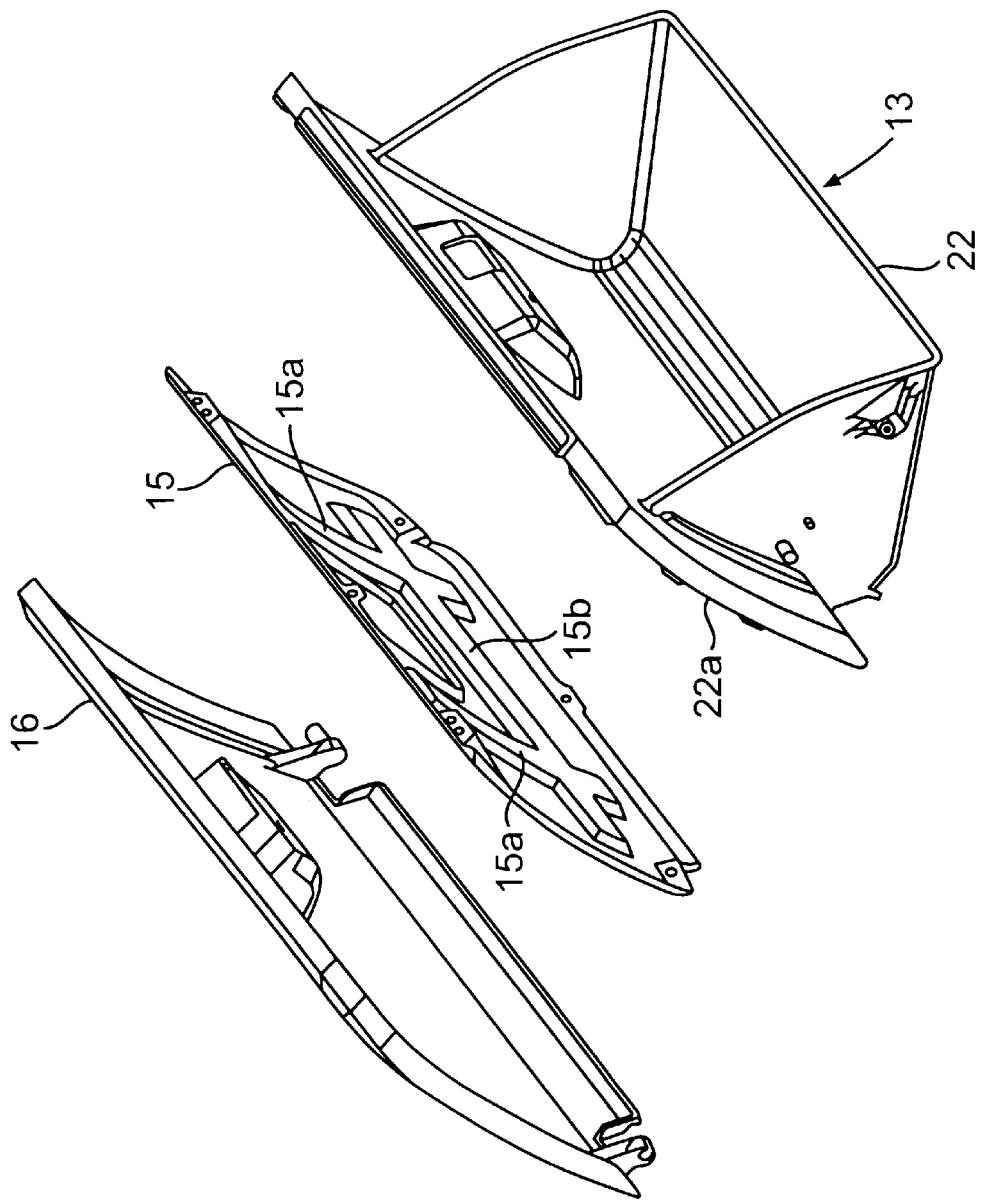
FIG. 10 is an exploded perspective view of a glove compartment according to an embodiment of the present invention.

As shown in FIG. 9 and FIG. 10, the glove compartment (13) includes a reinforcement panel (15) disposed between the lid (16) and the front surface (22a) of the glove compartment main body (22). Horizontal and vertical ribs (15a), (15b) protrude from the flat plate surface of the reinforcement panel (15) to increase rigidity of the structure.

Figure 11:
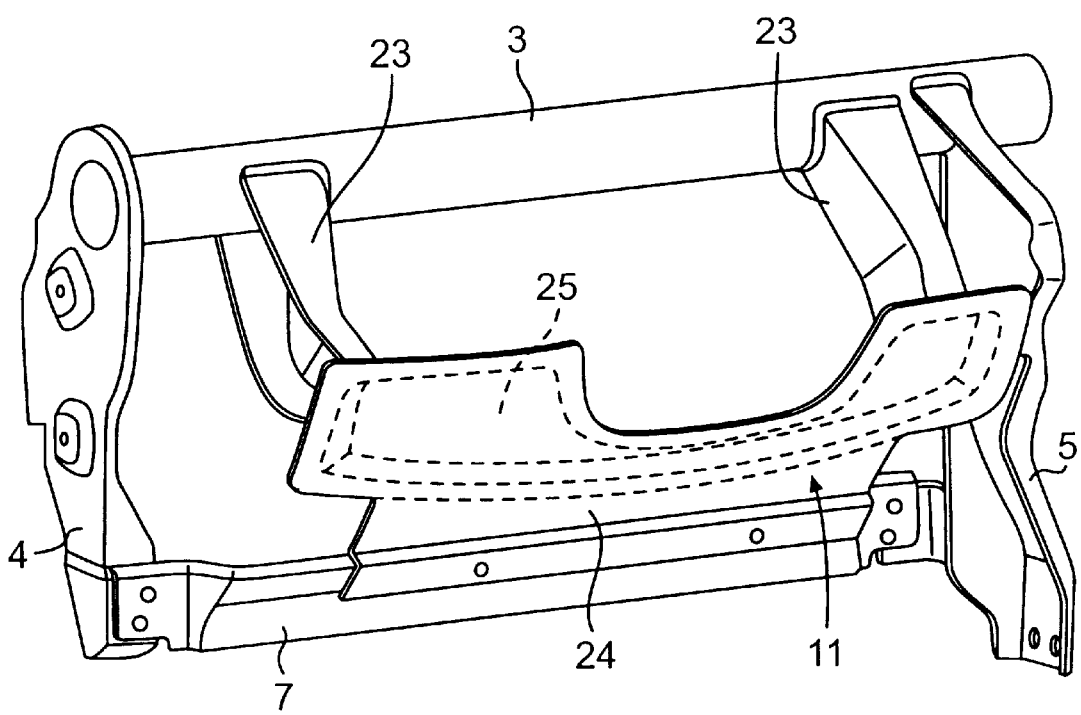
FIG. 11 is a perspective view of a knee bolster on the driver side according to a second embodiment of the present invention.
Figure 12:
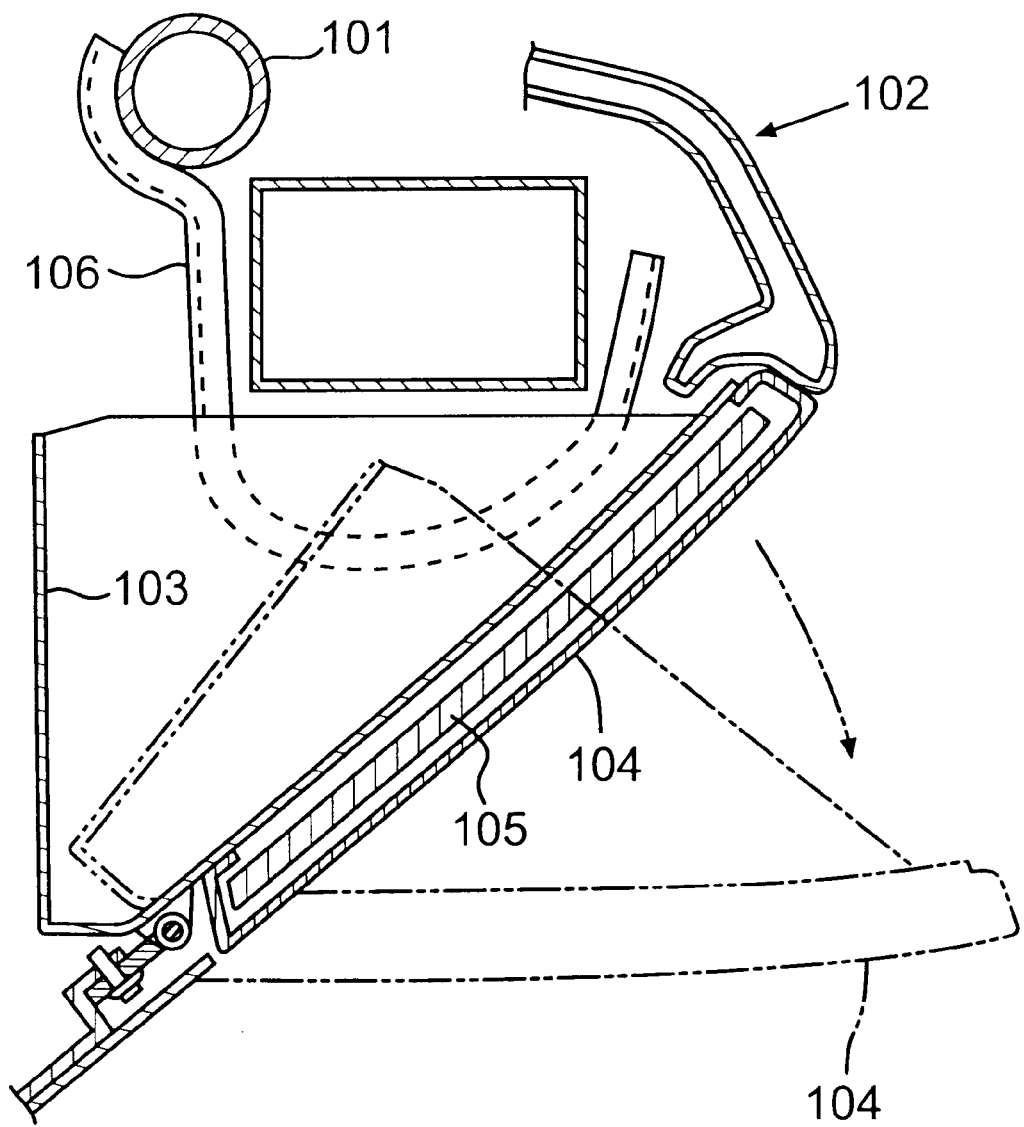
FIG. 12 is a cross sectional view of a conventional knee bolster structure for an automobile.

In the second embodiment shown in FIGS. 3 and 11, a knee bolster main body (11) is attached to the tips of the left and right stays (23) that are, for example, welded to the steering support member (3) on the driver side. The knee bolster body (11) also includes a closed cross section structure formed by attaching the periphery of the reinforcement member (25) to the rear top portion of the knee bolster panel (24). Because of the closed cross section structure, the upper portion of bolster panel (24) is more rigid than the rest of the panel that is made from plate material. As a result, the energy from large impact loads can be dissipated by deformation of the upper portion, while lower energies can be effectively dissipated by the rest of the bolster main body (11).

According to the invention, a wide range of loads acting from different directions can be dissipated by the knee bolster panel (14) and by the reinforced lid (16) of the glove compartment (13). When a load of large magnitude is applied to the upper portion of the knee bolster main body (12), due to impact with the knees of a large passenger, the impact energy can be dissipated by deformation of the closed cross section structure (X) formed by the reinforcing member (17) and the back surface of the upper portion (14a) of knee bolster panel (14). This closed cross section structure is rigid, and can dissipate the energy from large impact loads effectively.

Conversely, when a small magnitude load is applied to the lower part of the knee bolster main body (12) by impact with the knees of a small passenger, the load can be absorbed by the lid (16) reinforced by the reinforcement panel (15). Lid (16) is backed on its sides by side portions (14b) and on its top by upper portion (14a) of knee bolster panel (14). Some of the impact energy is thus transmitted from lid reinforcement panel (15) to the knee bolster panel (14). The lid structure is less rigid than the structure of the knee bolster upper portion, and thus deforms more easily, and can effectively dissipate the energy of smaller impact loads.

On the driver side, energy from knee impacts is absorbed by the knee bolster panel (24). Similarly to the knee bolster on the passenger side, a reinforcement panel (25) forms a closed cross section together with the upper portion of the knee bolster panel (24). Large loads can be absorbed by this closed cross section structure of the bolster upper portion, while the remainder of the knee bolster deforms more easily, and is well suited to absorb smaller loads.

According to the aforementioned embodiment, large loads due to knee impacts are absorbed by a two-layer structure comprising the upper portion of the knee bolster panel (14) and the reinforcement member (17), arranged to form a closed cross section structure (X). Small impact loads can be absorbed by the lower portion of the knee bolster panel (14) and by the reinforcement (15) formed in the glove compartment lid. In addition, the member (8) supporting the bottom portion of knee bolster panel (14) is less rigid than the steering support member (3). This arrangement contributes to a design where the upper portion of the knee bolster is more rigid than the bottom portion, so that each portion is able to deform and absorb the energy of large and small impact loads, respectively.

Moreover, because the knee bolster has a substantially identical cross section along its dimension extending from left to right in the vehicle, loads acting along the entire horizontal dimension of the bolster can be equally absorbed.

The rigidity of the knee bolster structure can be easily modified by altering the plate thickness of the knee bolster panel (14), of the reinforcement member (17), or of the reinforcement (15). Thus, it is easy to tailor the structure for specific applications.

The knee bolster panels (14), the reinforcement member (17), the reinforcement (15), and other structural components of the knee bolster are located within the instrument panel (1), so that the outer appearance of the dashboard is not sacrificed. This results in cost savings because it is not necessary to paint or otherwise embellish the structure.

The knee bolster disposed on the driver side of the vehicle exhibits the same advantages as the knee bolster disposed on the passenger seat side, due to the reinforcement panel (25) forming a closed cross section with the upper portion of knee bolster panel (24).

As described above, the automobile knee bolster structure according to the present invention exhibits several benefits. The knee bolster structure is designed so that its upper portion can effectively absorb the energy of large impact loads, because the top of the knee bolster main body is formed as a closed cross section structure. At the same time, energy generated by small impact loads can also be dissipated effectively by the remaining portions of the knee bolster. Thus, not only can the structure absorb impact loads that originate from various directions, but loads of different magnitude that are applied to the upper portion and to the bottom portion of the knee bolster can be dissipated by deformation of a structure having a stiffness appropriate to the load.

The knee bolster main body may be arranged in a position corresponding to the glove compartment, and comprises panels located on the top side and on both lateral sides of the glove compartment, a reinforcement member forming a closed cross section structure with the upper portion of the knee bolster panel, and a reinforcement panel arranged along in the inner surface of the aforementioned glove compartment lid.

It will be apparent to those skilled in the art that various modifications and variations can be made in the knee bolster structure of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed:

1. An automobile knee bolster for absorbing energy from impacts with the knees of an occupant, disposed in a portion of a dashboard corresponding to a glove compartment, and having a main body comprising:

a knee bolster panel including an upper portion, a pair of side portions, and an energy absorbing protruding component, said upper portion arranged in the top of the glove compartment, said side portions arranged on the lateral sides of the glove compartment, said protruding component extending from a central portion of said upper portion, said protruding component being connected to the back of said dashboard;

a reinforcement member attached to the upper portion and oriented along a width of the automobile, wherein the reinforcement member and the upper portion define a closed cross section structure; and a reinforcement panel arranged behind a lid of the glove compartment cooperating with the main body to dissipate impact energy.

2. The automobile knee bolster according to claim 1, wherein the knee bolster portions arranged on the top and lateral sides of the glove compartment back the lid of the glove compartment when the lid is closed.

3. A knee bolster assembly for absorbing energy from collisions with knees of an occupant in an automobile having a dashboard and a chassis, the knee bolster assembly being disposed in a lower portion of the dashboard, the knee bolster assembly comprising:

a steering support member extending the width of the automobile and located behind the dashboard;

a bracket joining the steering support member to the chassis;

a side brace joined to the steering support member, the side brace being spaced from said bracket;

a thin plate member extending between the side brace and the bracket;

a main body comprising a closed cross section structure and a knee bolster panel, the main body being mounted between the steering support member and the thin plate member, the knee bolster panel having an upper portion, a pair of side portions, and an energy absorbing protruding component, said protruding component extending from a central portion of the upper portion, the protruding component being connected to the back of the dashboard.

4. The knee bolster assembly according to claim 3, wherein the main body includes a reinforcement member oriented along the width of the automobile and attached to the knee bolster panel, the reinforcement member and the knee bolster panel defining the closed cross section structure.

5. The knee bolster assembly according to claim 3, wherein the closed cross section structure is disposed in an upper portion of the main body.

6. The knee bolster assembly according to claim 4, wherein the reinforcement member is attached to the upper portion of the knee bolster panel.

7. The knee bolster assembly according to claim 4, wherein portions of the knee bolster panel are formed of a plate-like structure.

8. The knee bolster assembly according to claim 3, further comprising stays attaching the main body to the steering support member.

9. The knee bolster assembly according to claim 3, wherein the upper portion of the knee bolster main body is attached to the steering support member.

* * * * *